United States Patent
Long

[11] Patent Number: 5,826,927
[45] Date of Patent: Oct. 27, 1998

[54] HAND-HELD MATERIAL CARRIER

[76] Inventor: Loren L. Long, 2067 Quail Canyon Ct., Hayward, Calif. 94542

[21] Appl. No.: 936,470

[22] Filed: Sep. 22, 1997

[51] Int. Cl.[6] .................................................. B25G 7/12
[52] U.S. Cl. .............................................. 294/15; 294/62
[58] Field of Search .................................. 294/3, 15, 16, 294/62, 63.1, 104, 164, 167, 168

[56] References Cited

U.S. PATENT DOCUMENTS

| | | | |
|---|---|---|---|
| 1,041,949 | 10/1912 | Bandemer | 294/62 |
| 1,153,269 | 9/1915 | Sturm, Sr. | 294/62 |
| 1,581,077 | 4/1926 | Mosier | 294/62 |
| 2,776,856 | 1/1957 | Ingram | 294/16 |
| 2,821,426 | 1/1958 | Hanner | 294/15 |
| 3,059,954 | 10/1962 | Matejicek | 294/16 |
| 5,039,150 | 8/1991 | Jones et al. | 294/62 |
| 5,127,693 | 7/1992 | Pruit | 294/15 |

FOREIGN PATENT DOCUMENTS

| | | | |
|---|---|---|---|
| 43926 | 3/1931 | Denmark | 294/62 |
| 459245 | 1/1937 | United Kingdom | 294/62 |

*Primary Examiner*—Dean Kramer
*Attorney, Agent, or Firm*—L. E. Carnahan

[57] ABSTRACT

A hand-held carrier for materials such as lumber and bricks. The carrier includes a riser shaft which is integral with or connected to a foot plate on which the material rests, the foot plate being thin and near-pointed at the toe and thicker at the heel where it is connected to the riser shaft. A housing is slideably mounted on the riser shaft and is adjustably retained along the riser shaft by a retaining pin or clamping assembly which extends into holes in the riser shaft. A lever or pinch handle is pivotably mounted to the housing and includes a handle section at one end and a clamp or pinching section at the other end. The lever can be rotated 180 degrees relative to the housing to enable use by a left-handed or right-handed person. As the lever is pivoted with the handle section being raised, the clamp section thereof contacts the material located on the foot and pinches or retains the material between the foot and the lever clamp section, whereby the material can be readily and easily moved as needed. The clamp section of the lever may include a band or wire cutter to enable quick removal of any material with retaining bands or wires.

20 Claims, 3 Drawing Sheets

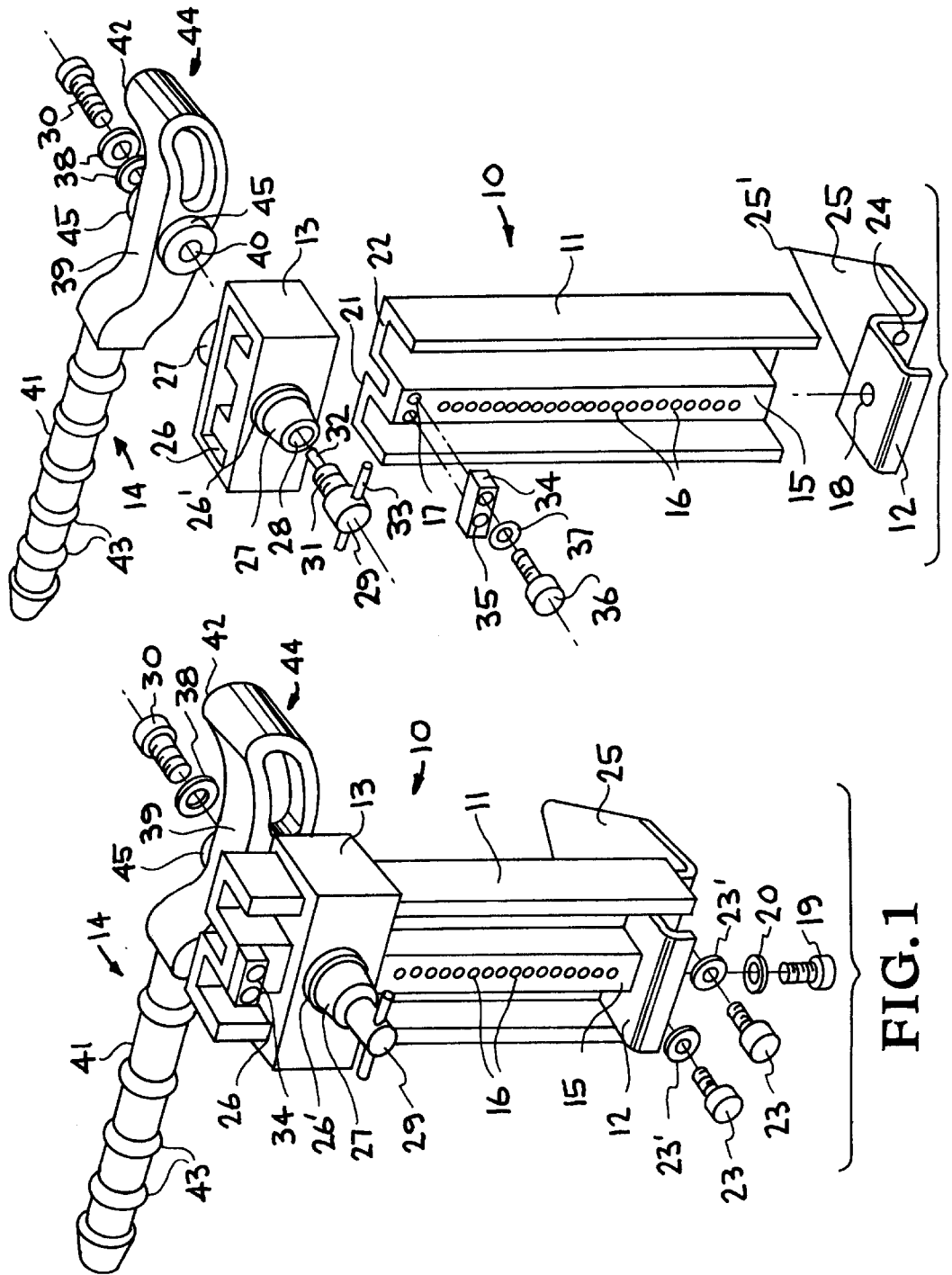

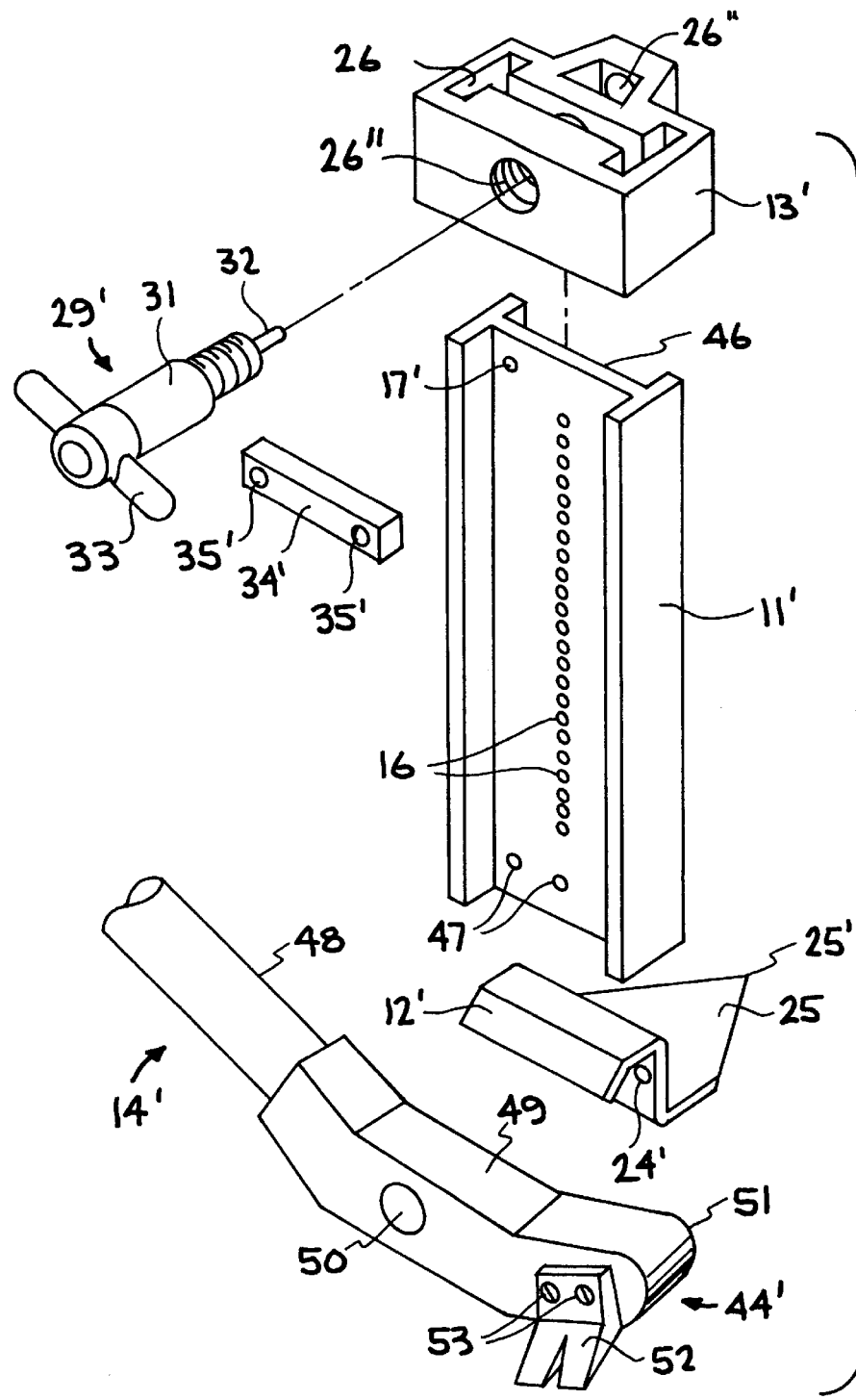

HAND-HELD MATERIAL CARRIER

The present invention relates to the transport of materials, particularly to moving materials by hand, and more particularly to a hand-held material carrier which is adjustable for varying loads and can be utilized by left-handed or right-handed persons, as well as being self-loading.

Movement of materials, such as lumber and bricks, by hand has been a difficult chore. For example, movement of construction studs (eight foot 2×4 inch pieces) by hand is difficult when more than two studs are carried in that the ends of the studs tends to separate or scissor as the human hands are not large enough to function as clamps. This stud end separation or scissoring becomes a problem when being carried through narrow passageways, doors and stairways, for example. Also, it is difficult to separate a few studs from a stack of studs, for example, since the studs tend to slide endwise and slip sideways when moved. Similarly, it is difficult to move other materials, such as bricks or blocks, without injury to the carrier's fingers, or movement of a stack of bricks while being carried. Thus, there has been a need for a means by which materials can be readily carried by hand without the above-referenced and other problems associated therewith.

The present invention provides a solution of the above-referenced material carrying problems by providing a hand-held material carrier which enables clamping of materials, such as construction studs, bricks, blocks, etc., whereby such can be readily carried by hand. The material carrier of the present invention is constructed to enable use by a left-handed or right-handed person, and is constructed to enable carrying of loads of varying heights. The material carrier includes a foot plate which is placed under the material and a pivoted lever adjustably mounted on a riser connected to the foot, which clamps the material between the pivoted lever and foot, whereby the material can be readily carried by hand. The pivoted lever or pinch handle may include a cutter for wire or bands which are conventionally used as a retaining means during shipping of materials.

SUMMARY OF THE INVENTION

It is an object of the present invention to provide a carrier for materials.

A further object of the invention is to provide a hand-held material carrier.

A further object of the invention is to provide a carrier for materials which can be utilized by right-handed or left-handed persons.

Another object of the invention is to provide an adjustable hand-held carrier for materials whereby loads of differing heights may be easily carried by hand.

Another object of the invention is to provide a hand-held material carrier which includes a foot plate which can be slid under the material to be carried and pivotable lever which clamps the material positioned on the foot member by merely raising the pivotable lever.

Another object of the invention is to provide a hand-held material carrier which includes a riser member having a foot plate or member located at one end and a pivotable lever or pinch handle adjustably located on the riser member, whereby material to be connected is clamped intermediate the foot member and the pivotable lever.

Another object of the invention is to provide a self-loading and unloading, hand-held material carrier which is constructed to enable loading of the carrier with material from a stack of material without first moving the material to be carried from the stack.

Another object of the invention is to provide a hand-held material carrier which additionally includes means for cutting material retaining wires or bands.

Other objects and advantages of the invention will become apparent from the following description and accompanying drawings. The invention comprises a hand-held material carrier. The material carrier is constructed to be self-loading from a stack of material. The carrier enables one to readily carry material, such as lumber or bricks, without the material moving while being carried. This is accomplished using a carrier which includes a riser shaft having connected thereto a foot plate or member to support the material to be carried, and an adjustable, pivotable lever or pinch handle which functions to clamp the material supported on the foot member and as a carrying handle. The pivotable lever may be adjusted along the riser shaft via a housing removably pinned to the riser shaft. The pivotable lever may be exchangeably mounted for use by a right-handed or left-handed user. By simply inserting the foot member into a stack of material and raising the pivotable lever, the material is clamped in the carrier and can be moved by merely lifting the pivotable lever. The pivotable lever may be provided with a cutter whereby wire or steel bands retaining the material to be carried can be cut using only the material carrier.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1 illustrates a partially exploded view of an embodiment of the material carrier made in accordance with the invention.

FIG. 2 is an exploded view of the FIG. 1 material carrier, with the foot member retaining bolts omitted, but illustrated in FIG. 1.

FIG. 3 illustrates the major components of another embodiment of a material carrier of the invention, including a wire or band cutter, with the retaining bolts for the foot member and clamping level bolt omitted, but which are similar to those shown in the FIG. 1 embodiment.

DETAILED DESCRIPTION OF THE INVENTION

Figure 4:
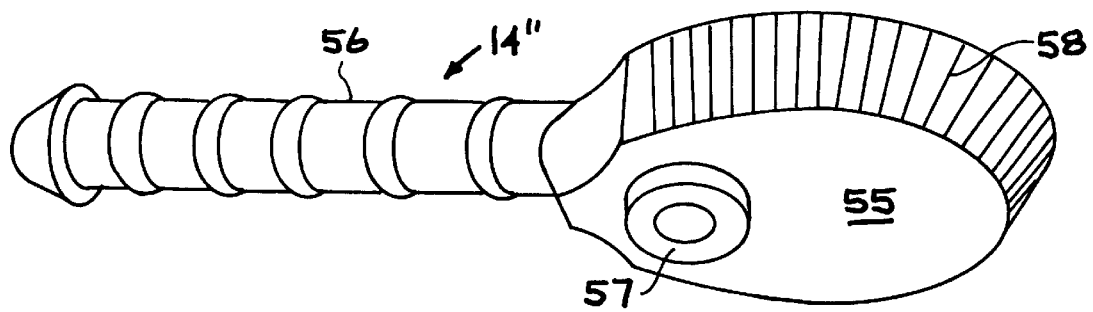
FIG. 4 illustrates another embodiment of a pinch handle for use in the embodiments of FIGS. 1–2 and 3.

The present invention is directed to a material carrier. The carrier enables carrying of loose lumber, bricks, etc. without the material moving or slipping during carriage of the material. This is accomplished by the use of a vertical riser shaft having a foot plate or member at one end and a pivotable lever or pinch handle adjustably mounted at an opposite end of the riser shaft. The pivotable lever is connected to the riser shaft via a slideable housing or module which can be adjustably positioned along the length of the riser shaft via a clamp or pin assembly adapted to be inserted into various holes along the length of the riser shaft. The pivotable lever or handle is connected to the adjustable housing via a bolt or pin arrangement, such that the bolt for the pivotable lever can be removed and the pivotable lever can be rotated 180 degrees relative to the adjustable housing to enable ready use by either a right-handed or left-handed user. The pivotable lever or handle is provided at one end with a flattened curved section which serves to contact material to be carried and pinch or clamp the material between the flattened curved section and the foot member by merely lifting up on the pivotable lever or handle, and by which the material clamped in the carrier can be transported to a desired location without slippage or movement (scissoring) of the material while being transported. The foot plate or member is preferably at least partially pointed and thinned at the outer end to enable it to be slid between or under bricks, blocks, lumber, etc. located in a stack. Thereafter the lever or handle is pivoted to force the flattened curved end section thereof against the material adjacent the riser shaft and clamps material thereunder on the foot member for transport of the material. Thus, the material carrier is self-loading, if desired.

To eliminate carrying of a tool to cut wires or bands retaining the material to be carried, since most lumber, bricks, blocks, etc. are initially retained in stacks by wires, bands, etc., the flattened curved end section of the pivotable lever or handle may include a cutter for wire or bands. Thus, the material carrier provides a multi-purpose tool in that it can be hand loaded to carry a plurality of individual materials, it can be self-loaded from a stack of material to be moved, and it can be used as a retaining wire or band cutter, as well as being constructed to carry loads of various heights by either a right-handed or left-handed user.

FIGS. 1 and 2 illustrate an embodiment of the material carrier of the present invention, and FIG. 3 illustrates another embodiment which differs from the FIGS. 1–2 embodiment primarily in the configuration of the riser shaft and the adjustable housing. While both embodiments illustrate the foot plate or member as being removably secured to the vertical beam or riser shaft by bolts or screws, the foot member can be fixedly secured to the riser shaft by welding, etc., or it can be formed integrally with the riser shaft. The clamping or pin assembly for the adjustable housing or module may be a spring loaded type pin assembly, for example, having a body or member which is threaded into an opening in the housing or module. Also, the pivotable lever or handle can be rotated 180 degrees for either left-handed or right-handed users.

Referring now to FIGS. 1 and 2, this embodiment of the material carrier, generally indicated at 10, basically comprises a riser shaft or vertical beam 11, a foot plate or member 12, a housing or vertical slide module 13, and a lever or pinch handle 14. The riser shaft 11 is formed by a modified W-shaped member having flattened interconnecting legs or sections, with a flattened central leg or section 15 having a plurality of spaced holes or openings 16 along the length thereof, and at an upper end a pair of openings 17, which may be threaded. The central section 15 of riser shaft 11 is also provided at the lower end with a vertically extending threaded opening, not shown, for attachment via an opening 18 in the foot member 12 by a bolt 19 and washer 20. Flattened leg connecting sections 21 and 22 are each provided with threaded openings, not shown, into which bolts or screws 23, with washers 23', are inserted via openings 24 in foot member 12, only one shown. The riser shaft 11 may be constructed of aluminum, fiber glass, reinforced glass fiber, polypropylene, or other material of high strength but of light weight. The foot member 12 may be constructed, for example, of steel or other strong material and in this embodiment includes a tapered end section 25 which may also be thinned toward the point 25' of tapered section 25 to enable easy insertion of the foot member between or under material to be carried. Also, the foot member 12 may include a rounded heed section as shown to assist in unloading material.

The housing or vertical slid module 13 which may be constructed of aluminum, fiberglass, polypropylene, etc., includes an opening 26 of the configuration of the cross-section of the riser shaft 11, in this embodiment a flattened W-shaped opening, and a transverse threaded opening 26' through which an externally threaded member 27 is inserted and extends through housing 13, member 27 having a threaded opening 28 into which a threaded pin assembly 28 is threaded and a threaded opening, not shown, into which a bolt 30 for the lever or handle 14 is threaded. The pin assembly 29 includes a body section 31, a locator pin 32 and a pull or handle 33, with the locator pin 32 extending into one of the vertical holes or openings 16 of riser shaft 11 to retain the housing 13 on the riser shaft 11. Pin assembly 29 may be of a conventional spring-loaded type, whereby outward movement of the pull or handle 33 withdraws the pin 32 under compressed spring pressure from opening 16 and upon release of the pull or handle 33, the pin 32 is inserted by spring pressure into an opening 16, whereby the housing 13 can be adjusted along the riser shaft 11. A retainer or stop member 34 having openings 35 is connected to riser shaft 11 via a pair of bolts or screws 36 and washers 37 (only one each shown) inserted into openings 17 of riser shaft 11. Stop member 34 may be constructed of aluminum, for example.

Lever or pinch handle 14 is pivotably mounted to housing 13 via bolt 30 and washers 38 and removably mounted in threaded member 27, and may be constructed of any strong, lightweight material, such as aluminum, fiberglass, polypropylene, etc. and can be molded or otherwise constructed. The lever or handle 14 includes a central section 39 having an aperture 40 through which bolt 30 extends, a handle section 41, and a curved, flattened clamp or pinch section 42, each integral with central section 39. Handle section 41 may include raised sections or bicycle type grip 43 to provide a better hand grip, and clamp or pinch section 42 may be provided with a rough surface, generally indicated at 44, such as grooves and/or protruding sections to provide a better grip or pinch of material to be carried. Central section 39 of lever or handle 14 includes a pair of protruding lands 45, which function as wear surfaces when the handle 14 is bolted to housing 13.

The FIG. 3 embodiment differs from the embodiment of FIGS. 1–2 by providing a more simplified construction of the material carrier, the differences being primarily in the riser shaft 11, the housing 13, and the level or handle 14 with corresponding components being give similar reference numerals. As seen in FIG. 3, the riser shaft 11' is of an I-shaped configuration with openings 16 spaced along the length of the interconnecting leg 46 of the I-shaped member, and with threaded openings 47 in the interconnecting leg 46 by which the foot member 12' is connected thereto via openings 24' (only one shown) in foot member 12' and bolts or screws and washers similar to bolts 23 and washers 23' in the FIGS. 1–2 embodiment. Interconnecting leg 46 is also provided with a pair of threaded openings 17' (only one shown) via which a stop member 34' is secured via bolts and washers extending through openings 35'. The riser shaft 11 or 11' can be of other cross-sectional configurations, such as illustrated in FIGS. 5A–5E.

Housing or slide module 13' has an opening 26 of an I-shaped configuration to match the configuration of riser shaft 11', and is provided with a transverse opening 26", which is threaded at opposite ends to enable a pin assembly 29' and a bolt, not shown, but similar to bolt 30, to be threaded thereinto. Should the riser shaft be of a different cross-section, the opening 26 will be of a corresponding cross-section. The lever or pinch handle 14' includes a pair of interconnected, or integral, sections 48 and 49 with section 49 having an aperture 50 for attachment to housing 13' and a curved, flattened end 51 having a rough surface 44'. Section 49 of lever or handle 14' is provided with a wire or band cutter or breaking claw 52 which is secured to section 49 via threaded screws or bolts 53. While not shown, section 49 includes threaded openings on opposite sides whereby cutter or breaker claw 52 can be attached to either side of the lever or handle 14'. Note that in FIG. 3, the housing 13' is constructed as a one-piece member, thus eliminating the threaded member 27 of the FIGS. 1–2 embodiment.

FIG. 4 illustrates a modified pinch handle or lever whereby rotation of the lever eliminates removal and replacement of the pivot bolt for providing left-handed or right-handed use. In FIG. 4, the lever or handle 14" is designed to be utilized by either a left-handed or right-handed user by simply positioning the handle on one side or the other of the housing 13. As shown, the lever or handle 14" includes a body or pinch section 55 and a handle section 56, which may be made integral with or secured to body section 55. Body or pinch section 55 is provided with a pair of protruding sections or lands 57, only one shown, which provide a wear surface when the handle 14" is pivotably mounted to an adjustable housing, such as housings 13 and 13'. As readily seen, the body or pinch section 55 is symmetrically configured and has a roughened surface 58 extending thereabout, such that when the pinch section 55 is positioned for either left-handed or right-handed use, the roughened surface 58 will contact the material to be carried.

Figure 5A:
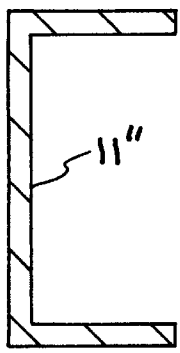
FIGS. 5A–5E illustrate additional cross-sectional views of the riser shaft of FIGS. 1 and 3.
Figure 5B:
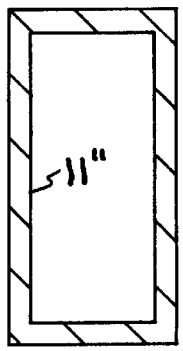
Figure 5C:
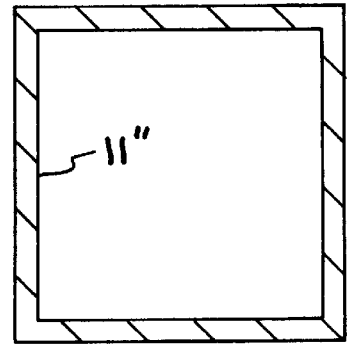
Figure 5D:
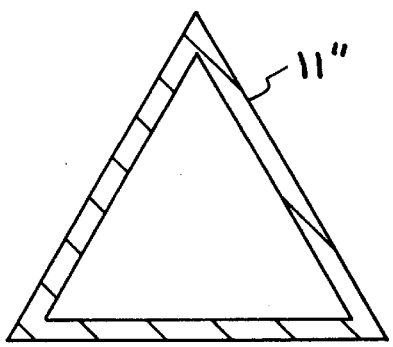
Figure 5E:
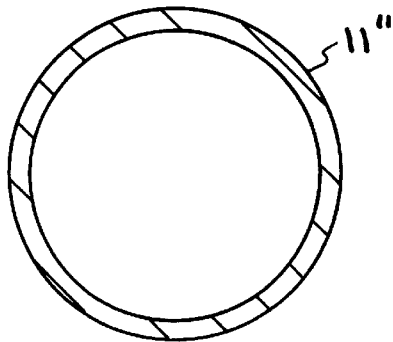

FIGS. 5A–5E illustrate, in cross-section, additional configurations of the riser shaft 11 or 11', and are each generally indicated by 11". FIG. 5A illustrates a C-shape, 5B is a rectangular-shape, FIG. 5C is a square-shape, FIG. 5D is a triangular-shape, and FIG. 5E illustrates an O-shape configuration. As pointed out above, the opening 26 in the adjustable housing 13 or 13', is to be configured to cooperate with the cross-section of the riser shaft.

It has thus been shown that the material carrier of this invention is ideally constructed to break a steel band, for example, retaining a stack of lumber, bricks, etc. and self-load a quantity of the retained material, and retain the material while being transported to a desired location, whereafter it can be self-unloaded. The carrier has self-loading or self-unloading capabilities, thereby eliminating moving or stacking the material on the carrier for transport. The material carrier is designed for one person to carry multiple 2×4's, 2×6's, masonary bricks, blocks, etc., but heavier and/or wider, or longer, loads may be carried by plural material carriers and plural users located on opposite sides or at opposite ends of the material. Because of the pinching or clamping feature of the carrier, the carrier is capable of carrying many types of material, and prevents the separating or scissoring movement of the material during transport. Also, the riser shaft or vertical beam can be of various lengths, and due to the adjustable location of the pinching/carrying handle, the height of the load can be adjusted for different applications or intended uses.

To adjust the load height of the material carrier, merely pull the handle 33 of pin assembly 29 which withdraws the locator pin 32 from an opening 16 in the riser shaft 11 or 11', and slide the housing 13 along the riser shaft to a desired location or distance from the foot plate or member 12 or 12'. The proper location of the housing 13 along the riser shaft 11 is determined by the height from the foot plate or member 12 to the bottom of the curved flattened section of the lever or handle 14 to enable the curved flattened section to pinch or clamp the material on the foot plate or member 12. For example, to adjust the carrier to carry a desired number of items from a stack, slide the foot plate in between material at a desired location until the riser shaft is against the material. Pull the spring loaded pin locator and drop the housing until the handle or lever, in level position, comes in contact with the material. Release the pin locator so as to be inserted in the nearest opening in the riser shaft. The material carrier is now adjusted to carry repeated loads of this same height. To carry the material, a user merely positions the carrier as described above and raises one end of the lever handle which causes the curved (pinch) end of the handle to pinch or clamp the material until the handle is lowered, and the carrier is removed from the material. To unload material from the carrier in a neat stack, release pressure on the pinch handle and rotate the handle away from the material, whereby the foot member can be removed from under the load. To speed dump lumber or other non-fragile material, while the user is in standing position, simultaneously grab the heel of the foot plate or member with the free hand's fingertips and ease the pinch handle down, which will allow material to dump from the carrier. Lumber is picked up slightly forward of center to induce pinch handle pressure on the load which, in turn, causes the load to be sloped from front to rear when being transported. If the user desires the load to be sloped rear to front, so one can more easily descend a slope or stairs, the user need only to reverse handling of the carrier and use the carrier backwards. The slope of material being carried is controlled by the distance the carrier is placed forward of the material's center of balance.

The material carrier of this invention provides an ergonomically correct means of carrying material. The lumber or other material to be carried is picked up by the user from above the top of load and carried by the handle with one hand at the side of the user similar to carrying a piece of luggage. Normally when carrying lumber by hand, a person must bend over and grasp the load of lumber from both sides using both hands at the bottom of the load, which results in unsatisfactory strain on the person's back, which in due time results in back injury.

The material carrier of this invention is ideally suited for carrying lumber through a narrow passageway, hallway, doorway, and up or down stairs. The user does not need to twist their upper body or change the manner in which the lumber is being carried as the lumber is carried length-wise with the direction of travel. The user can walk in a normal fashion facing forward. When carrying a load of lumber with two hands in the same situation, the person must walk sideways, twist their upper body, or place lumber on their shoulder to position the lumber parallel with the direction of travel. Although this has been the accepted means of carrying lumber, it places the person carrying the lumber at a higher risk of straining their back or pulling a muscle. All of these prior methods of carrying material by hand are more difficult when it comes to controlling a stacked load such as 5 to 7 pieces of lumber, for example.

When picking up multiple pieces of lumber in one load, for example, the pinching action of the pivotable handle of the material carrier prevents the lumber load from separating sidewise (scissoring), which is common when carrying lumber with the hands, as scissoring is difficult to prevent.

The band breaking claw or cutter enables a user to open units or stacks of lumber, brick, or similar materials. To use, rotate the main body of the carrier 180 degrees up over the top of the pinch handle, then slide the fork of the claw onto the band or wire, and then briskly raise the pinch handle until the band breaks. The pivotable pinch handle or lever can also be removed from the material carrier via bolt 30 of the embodiments, and used as a stand-alone steel band breaker.

The pivotable lever or pinch handle is symmetrical in that it can be reversed in direction. To change the material carrier from right-handed to left-handed, or vice versa, the pivotable pinch handle bolt is removed, the handle rotated horizontally 180 degrees, and bolt is reinstalled. Likewise, the band-breaking claw mounting screws may be removed and then roused to reinstall the claw on the opposite side of the lever or pinch handle.

It has thus been shown that the present invention provides a material carrier for items such as lumber, bricks, etc. and enables a user to carry multiple items without same sliding, separating, or scissoring, due to the pinching or clamping action of the carrier when the carrier handle is raised. The carrier may be self-loaded or hand-loaded, and may be utilized by a right-handed or a left-handed user, and can be adjustable to enable carrying loads of various heights. Thus, the material carrier of the present invention overcomes the above-referenced problems associated with carrying materials by hand.

While particular embodiment of the material carriers, and particular materials, etc. have been described and/or illustrated to exemplify and teach the principles of the invention, such are not intended to be limiting. Modifications and changes may become apparent to those skilled in the field, and it is intended that the invention be limited only by the scope of the appended claims.

What is claimed is:

1. A carrier for materials, comprising:
   a vertically extending riser shaft,
   a foot member connected to one end of said riser shaft,
   a housing adjustably mounted on said riser shaft,
   said housing including an opening having a configuration substantially corresponding to a cross-section of said riser shaft, said riser shaft extending through said opening in said housing,
   means for adjustably mounting said housing along a length of said riser shaft, and
   a handle pivotably mounted on said housing,
   whereby pivotal movement of said handle is adapted to pinch material in said carrier enabling transport thereof.

2. The carrier of claim 1, wherein said means for adjustably mounting said housing includes a plurality of spaced openings along a length of said riser shaft, and wherein said housing is provided with removable means adapted to be removably inserted in one of said spaced openings for adjustably mounting said housing along a length of said riser shaft.

3. The carrier of claim 2, wherein said removable means comprises a pin assembly having a movable pin adapted to be inserted into a spaced opening of said riser shaft.

4. The carrier of claim 2, additionally including removable means for preventing removal of said housing from said riser shaft.

5. The carrier of claim 4, wherein said removable means for preventing removal of said housing comprises a member removably secured to an upper portion of said riser shaft.

6. The carrier of claim 1 wherein said riser shaft is constructed to have a selected cross-section including I-shaped and W-shaped, C-shaped, O-shaped, and square, rectangular and triangular-shaped cross-sections.

7. The carrier of claim 1, wherein said riser shaft is provided with a plurality of openings located in an interconnecting leg of a cross-section thereof.

8. The carrier of claim 7, wherein said cross-section of the riser shaft is W-shaped, and wherein at least a central interconnecting leg thereof is flattened, said plurality of openings being located in said flattened central interconnecting leg.

9. The carrier of claim 1, wherein said foot member is removably connected to a lower portion of said riser shaft.

10. The carrier of claim 1, wherein said foot member includes a tapered end section.

11. The carrier of claim 10, wherein said tapered end section of said foot member has a thinning taper extending to an outer portion of the tapered end section.

12. The carrier of claim 1, wherein said opening in said housing has a configuration corresponding directly to a cross-section of said riser shaft, said housing being adjustably secured to said riser shaft by removable means.

13. The carrier of claim 12, wherein said removable means comprises a pin assembly mounted in said housing, said pin assembly having a movable pin adapted to be removably inserted in one of a plurality of openings in said riser shaft.

14. The carrier of claim 13, wherein said pin assembly is of a spring-loaded type.

15. The carrier of claim 1, wherein said handle is pivotably mounted to said housing by a removable means.

16. The carrier of claim 1, wherein said handle includes at least a handle section and a clamp section, upon movement of said handle section in one direction causing said clamp section to contact and pinch material in said carrier, and movement of said handle section in an opposite direction causing the clamp section to remove the pinch on the material.

17. The carrier of claim 1, wherein said handle includes a removable means for breaking material retaining means.

18. The carrier of claim 17, wherein said removable means comprises a breaking claw removably secured to either side of said handle.

19. A carrier for materials, comprising:
   a riser shaft,
   a foot member connected to said riser shaft,
   a housing adjustably mounted on said riser shaft, and
   a handle pivotably mounted on said housing by a removable means,
   said handle being constructed to be mounted on said housing for either a left-handed or right-handed user by removing said removable means, rotating said handle, and reinserting said removable means,
   whereby pivotal movement of said handle is adapted to pinch material in said carrier enabling transport thereof.

20. A material carrier constructed to be hand-held and self-loading and unloading, said material carrier comprising:
   a member having at least a plurality of spaced openings along at least a section thereof,
   a foot plate located at one end of said member and constructed to be inserted under material to be carried,
   a housing adjustably mounted on said member and including removable means adapted to removably extend into at least one of said spaced openings for adjusting the location of said housing along said member, and
   a removable pinch handle pivotably mounted on said housing and including an end section adapted to pinch and retain material in said material carrier during transport thereof, said removable pinch handle being constructed to be reversibly mounted to enable use thereof by a left-handed or right-handed user.

* * * * *